United States Statutory Invention Registration [19]

[11] Reg. Number: H710

Hooper et al. [43] Published: Nov. 7, 1989

[54] HORIZON REFERENCE SYSTEM FOR A ROTATING BODY

[75] Inventors: John O. Hooper; Bruce M. Heydlauff; Robert B. Dillinger, all of Ridgecrest, Calif.

[73] Assignee: The United States of America as represented by the Secretary of the Navy, Washington, D.C.

[21] Appl. No.: 700,981

[22] Filed: Nov. 2, 1984

[51] Int. Cl.[4] ..... G01S 5/04; G01S 3/02

[52] U.S. Cl. ..... 342/434; 342/351; 364/434; 244/3.20; 244/3.21

[58] Field of Search ..... 343/351, 434, 433; 364/434; 244/320, 321

[56] References Cited

U.S. PATENT DOCUMENTS

| | | | |
|---|---|---|---|
| 3,230,532 | 1/1966 | Whitney | 343/100 |
| 3,418,478 | 12/1968 | Falbel | 250/202 |
| 3,696,670 | 10/1972 | Collis | 73/170 R |
| 3,706,688 | 12/1972 | Bayle et al. | 343/6 R |
| 3,725,931 | 4/1973 | Moore | 343/100 ME |
| 3,777,270 | 12/1973 | Hardy et al. | 325/363 |
| 3,897,917 | 8/1975 | Johnson | 244/3.19 |
| 4,216,928 | 8/1980 | Hooper et al. | 244/122 AD |

OTHER PUBLICATIONS

Hatcher: "A Survey of Attitude Sensors for Spacecraft"; NASA SP-145, 1967.

Bremer: "Improvement of Scanning Radiometer Performance by Digital Reference Averaging"; IEEE TIM, vol. IM28, No. 1, Mar. 1979.

*Primary Examiner*—Thomas H. Tarcza
*Assistant Examiner*—Linda J. Wallace
*Attorney, Agent, or Firm*—William C. Townsend; W. Thom Skeer

[57] ABSTRACT

A horizon reference system has a plurality of microwave radiation sensors which are selectively connected by a controller to a superheterodyne receiver. The output signals of the receiver are processed in conjunction with antenna selection data to provide roll angle with reference to the horizon and roll angle rate data about any particular axis of the platform on which the sensors are mounted.

7 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 2
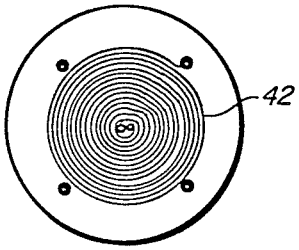
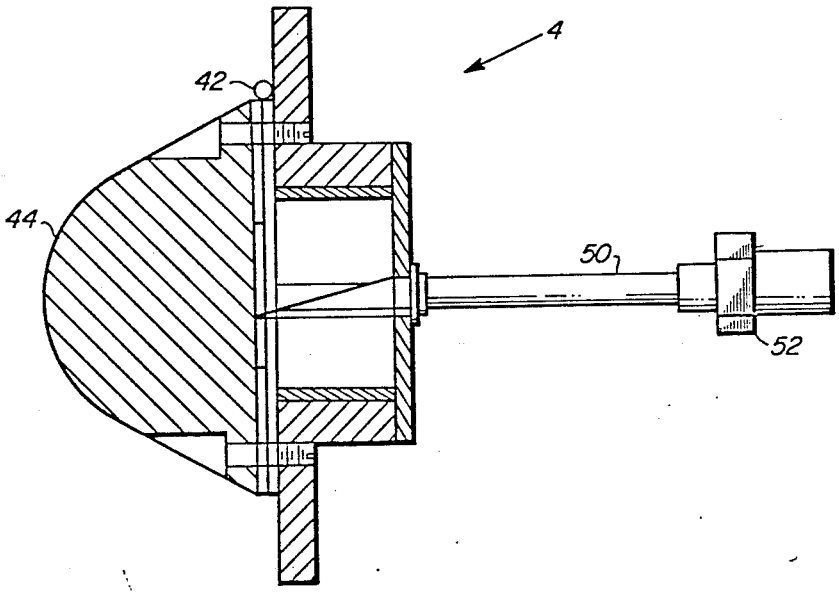
Fig. 3

HORIZON REFERENCE SYSTEM FOR A ROTATING BODY

BACKGROUND OF THE INVENTION

1. Field of the Invention

This device relates to radiation sensing and more particularly the measurement and processing of radiometric temperatures. Even more particularly this device determines the thermal contrast between sky and earth for indicating the location of the horizon and the attitude of the device's platform.

2. Description of the Prior Art

Radiometric thermal sensing is not a new concept. There are a variety of radiometric apparatuses. Some devices add a constant amplitude noise to the antenna signals. The sampled noisy antenna signal is compared with a reference signal and the detected difference is a noted response. Another approach is to do a similar comparison without adding the noise. This device may be used in a terrain avoidance system for airborne use or in radiometer sensing of radiation from various regions of air space to determine air turbulence. In yet another device, an infrared detector senses the thermal gradient between the horizon and outer space for determining orientation and attitude of a platform. Still another microwave radiometer system senses various polarization components and detects differences between orthogonal components. Such device provides more information than is required for ordinary detection of the thermal contrast between sky and earth.

None of the above mentioned devices contains a means for accurate and fast determination of attitude of the platform through radiometric sensing of the horizon. Neither the noise nor the comparative techniques suffice. The sampling of regions of air space or the sensing of polarization components, though appearing sophisticated, does not provide advantages in attitude determination. Thus none of the prior art noted is satisfactory for such determination.

SUMMARY OF THE INVENTION

The shortcomings of prior art radiometric devices are the lack of speed and accuracy of horizon determination and of processing such data as attitude determination about an axis to be input into navigational systems, autopilots, and the like. The present device avoids these shortcomings.

The present radiometric apparatus senses natural radiation with one of a plurality of antenna assemblies. An antenna selection switch sequentially connects one antenna at a time to a superheterodyne receiver via an isolator. The antenna selector switch is activated by an antenna selection controller. The signal from a selected antenna is mixed with a 15 GHz local oscillator signal which results in a double sideband intermediate frequency of about 500 MHz. The signal is amplified and detected. The output of the superheterodyne receiver is further amplified and any bias voltage offsets are eliminated with an auto-zero circuit via a video amplifier in conjunction with the antenna selection controller. The signal output of the video amplifier is fed into a signal processor which consists of a demultiplexer and a microcontroller. The signals are processed in conjunction with antenna selection signals to provide such data as roll angle, roll angle rate, and like data about any axis of the platform on which the sensors are mounted.

One object of the present radiometric device is to provide attitudinal data of a platform with speed and accuracy.

Another object of the device is be operational nearly instantly when needed.

Still another object of the device is to avoid electronic countermeasures.

Still another object of the device is to withstand large accelerational forces and yet function accurately. The device has no moving parts.

Even still another object of the device is its low cost compared with inertial type attitude devices. The cost of operation is also low due to the device's low power requirements.

BRIEF DESCRIPTION OF THE DRAWING

Further objects and advantages will become obvious to the person of ordinary skill when the following description of the preferred embodiment is studied in conjunction with the accompanying drawing figures wherein:

FIG. 2 is a drawing of an antenna receptor;

FIG. 3 is a side cut-away view of an antenna assembly;

DESCRIPTION OF THE SPECIFIC EMBODIMENT

Figure 1:
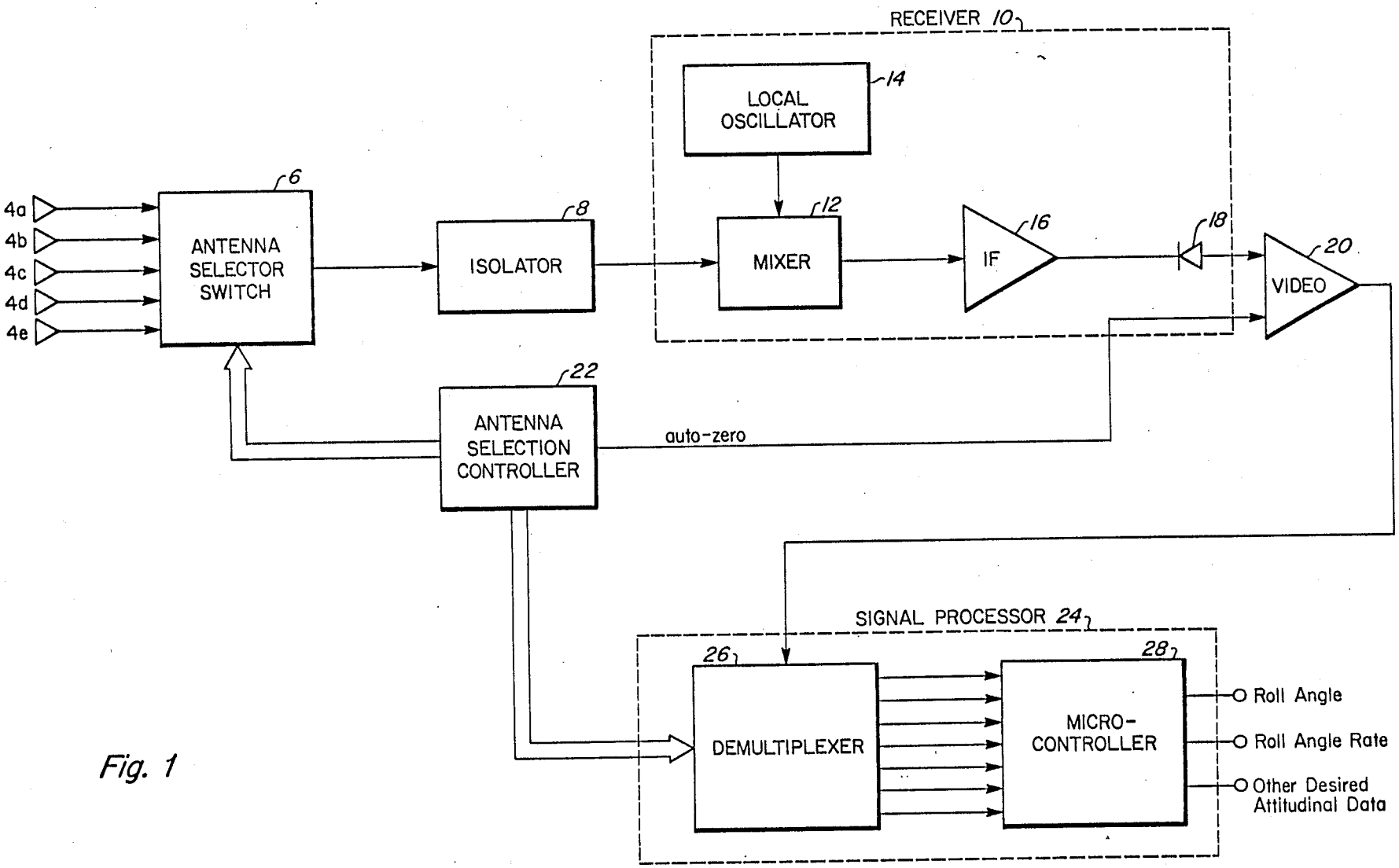
FIG. 1 is a basic diagram of the invention.

Five alternate antenna assemblies 4*a–e* make up the sensor portion of the present device. The antenna assemblies 4*a–e* sense the radiometric temperatures from the environment. A desired antenna is the spiral antenna. The common archimedean spiral 42 is utilized. See U.S. Pat. No. 2,863,145 of Dec. 2, 1958, SPIRAL SLOT ANTENNA, Edwin M. Turner. This is a well-known antenna. The application of a spiral antenna here is relatively undemanding (such as an operational bandwidth of only 7%), though with good gain or efficiency. Because spiral antennas have typically 3 dB beamwidths, 70° or larger, and the present desired 3 dB beamwidth is approximately 40°, a suitable lens is selected to achieve this result. Such lens is a variation of the well known "constant K" spherical lens 44 design shaped for ease of mounting for least drag. The receptor is designed to be a compounded, planar archimedean spiral 42 as shown in FIG. 2. Basically it has a 0.10 inch wide conductor and 0.010 inch gap spiral from about 0.054 inch diameter to 0.50 inch; 0.008 inch conductor end gap from 0.50 inch gap to 0.70 inch diameter; and 0.006 inch with end gap from 0.70 to 0.96 inch diameter. The tapered filament design is a good trade-off between wide lines for low loss signal transmission in the active region of a spiral, and narrow lines beyond there for easy filament terminations to reduce/eliminate end effects, with a graceful transition in between. See FIG. 3 for sectional drawing of antenna assembly 4. In this antenna typically the gain varies between 9.45 and 10.1 dB with respect to isotropic. The minus 3 dB beamwidths vary from 34° to 41°. In lieu of this type antenna ordinary horn antennas with a wide beam with 40° (±20°) may be used. The antenna is designed to operate at 15 GHz. The present antenna 4 in summary is right polarized circular archimedean spiral 42 with a focusing lens 44 which utilizes dielectric material of a particular shape and a constant K which makes for a narrower beam width as compared to a similar antenna without the dielectric focusing lens. There are other antenna designs which may be used to serve the purpose of the alternate antenna assemblies 4*a–e*.

The signals picked up by the alternate antenna assemblies 4*a–e* go to an antenna selector switch 6. Antenna selector switch 6 connects only one antenna at a time to the system through an isolator 8. Antenna selector switch 6 is cycled through the antenna assemblies 4*a–e* one at a time. The output to isolator 8 sees a sequence of six kinds of signals: five from the antennas 4*a–e* and one from looking into the open switch 6. The antenna selector switch 6 is a p-i-n diode switch. It is a five pole single throw switch. The power requirements for this switch 6 are +15 and +5 volts with switch control provided by 5 volt transistor-to-transistor logic (TTL) level signals, active low. The antenna switch 6 is constructed by Alpha Industries, Inc., in Lawrence, Mass. The part number of this switch is MT3885H3. The microwave signals from the alternate antenna assemblies 4*a–e* passing through antenna selector switch 6 go on through isolator 8. Isolator 8 controls the voltage standing wave ratio (VSWR) as "seen" by a receiver 10. Without the isolator 8 the VSWR changes cause an intermediate frequency (IF) amplifier 16 in the receiver 10 to "spike" and saturate when the antenna selector switch 6 changes from one alternate antenna assembly 4*a–e* to another alternate antenna assembly 4*a–e*. Isolator 8, although adding 0.5 dB of loss, virtually eliminates any switching transients. The signals passing through isolator 8 enter the 15 GHz receiver 10. However the present system is capable of operating without isolator 8. In such case the output of antenna selector switch 6 would go directly into receiver 10. Isolator 8, part number ASI-1118, is constructed by Aertech Microwave, Inc., of Dedham, Mass.

Figure 4:
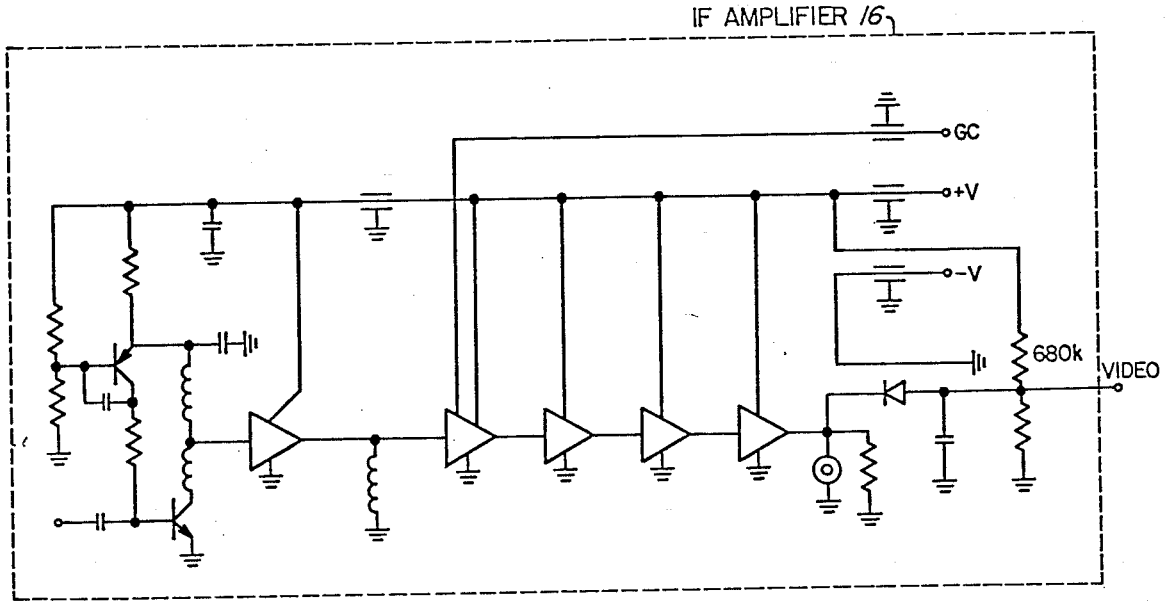
FIG. 4 is a schematic of the receiver intermediate frequency amplifier.

The output of isolator 8 goes into receiver 10. The 15 GHz receiver 10 is a self-contained superheterodyne receiver. A local oscillator 14 centered on 14.95 GHz drives a mixer 12 which is a double sideband mixer and mixes the input signal to ±500 MHz. This signal is then bandpassed and amplified in a five stage IF amplifier 16 providing ±70 dB of gain. An automatic gain control (AGC) amplifier is available on the circuit but it is set at minimum attenuation. The amplified signal is then detected by a detector 18 which uses a diode biased in the "square law" region. The output of the receiver 10 is a video signal whose voltage is linearly proportional to the power received ultimately from antenna assemblies 4*a–e*. This voltage ranges in the one to two millivolt region. The total receiver noise figure is 4.3 dB. The IF amplifier 16 bandwidth is from 50 MHz to 500 MHz. Because the receiver 10 is a double sideband type, the radio frequency bandwidth is from 14.5 to 15.5 GHz with a deadband of ±50 MHz around the 15 GHz frequency. The receiver 10 is constructed by Honeywell-Spacekom, Inc., at 212 E. Gutierrez St. in Santa Barbara, Calif. 93101. This receiver 10 was originally custom built. The model number of receiver 10 built by Honeywell-Spacekom is R14.9-U(70). This receiver 10 may be built by nearly any microwave equipment constructor. FIG. 4 provides an example intermediate frequency amplifier 16 of receiver 10.

The video signal from receiver 10 goes into video amplifier 20. The video amplifier 20 consists of three separate amplifiers in FIG. 5. The first stage amplifier 32 has a gain of 33 dB and is used mainly as a buffer which closely approximates an isolation amplifier. This is done to enhance common mode rejection and to isolate the common line of the receiver 10. The second stage amplifier 36 has a gain of 29 dB. A special "auto-zero command" loop 34 is tied in with this stage. The auto-zero amplifier 34 provides the means to remove offset voltages from the desired signals. The signal for this auto-zero command loop comes from an antenna selection controller 22.

Antenna selection controller 22 is essentially a timing and sequence generator. The antenna selection controller 22 sequentially operates the antenna selector switch 6 which in turn sequentially selects one of the alternate antenna assemblies 4*a–e* which passes the signal from the respective antenna into isolator 8. Besides selecting one of the antennas 4*a–e* the antenna selector switch 6 also switches to a sixth position which looks into an open switch, an off-state, which is the output used as a reference. The number of control signals from antenna selection controller 22 is five, for selecting each of the antennas. Those five signals flow into antenna selector switch 6. Three lines go from antenna selection controller 22 into a signal processor 24. Also going into this signal processor 24 is the output signal of video amplifier 20. The three lines into signal processor 24 from antenna selection controller 22 carry a binary code or word. Each word represents the selection of a particular antenna or no antenna as determined by antenna selector switch 6 which in turn is determined by the signals from antenna selection controller 22. The timing and sequence generator of antenna selection controller 22 is shown in a schematic in FIG. 6.

Figure 7:
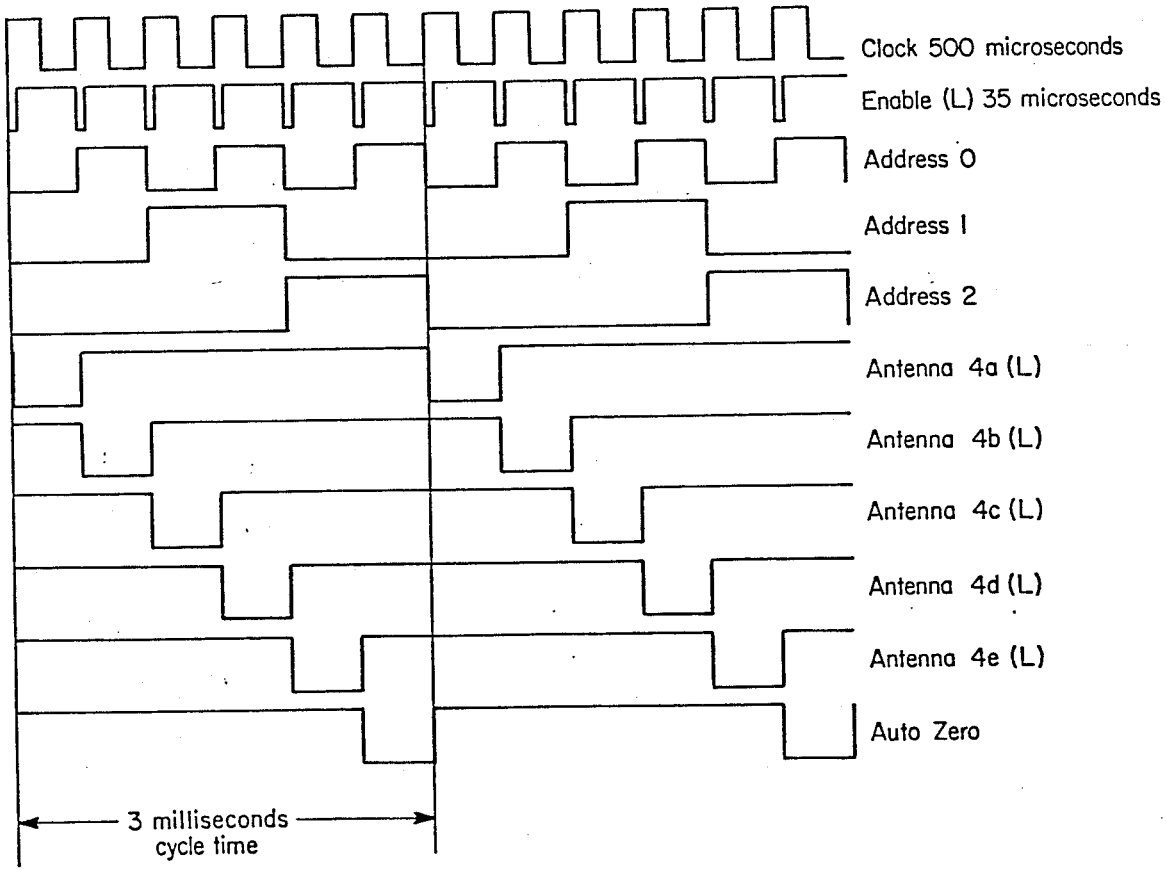
FIG. 7 is a timing diagram of the switching for the alternate antenna assemblies.
Figure 8:
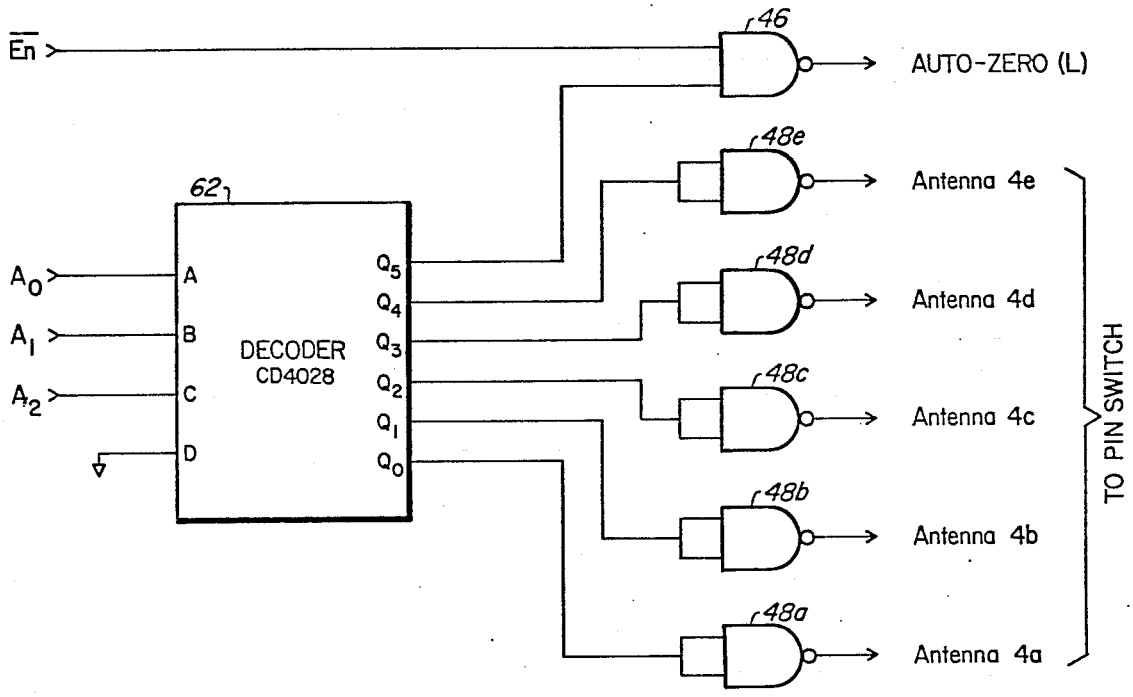
FIG. 8 is a schematic of antenna switch drivers and auto-zero related circuitry in the antenna selection controller.

A significant circuit is the auto-zero circuit between antenna selection controller 22 and video amplifier 20. The detected multiplexed antenna and reference load video signals from receiver 10 are amplified in video amplifier 20 and then are applied to an auto-zeroing function which effectively removes voltage offsets generated in the biased detector 18 and the first video amplifier stage 32. The auto-zero circuit also filters and subtracts the reference load measurement from all the other antenna measurements thus establishing a radiometric zero degree reference. It is the amplifier 34 of video amplifier 20 which incorporates the auto-zero command loop. When the system is "looking" at the reference load, as an example, an auto-zero switch 38, noted in FIG. 5, closes thus feeding the signal into an inverting integrator 34. The output of the integrator 34 is fed back into the second stage amplifier 36 noninverting input as a reference. This in essence clamps the reference load voltage to zero, removing any biases, and holds the reference voltage constant even if its temperature changes. When the system is no longer looking at the reference load, the switch 38 opens until the cycle repeats. See timing diagram in FIG. 7. The auto-zero command is generated from the decoded "five" or reference load enable signal. A 35 microsecond delay is incorporated in this command signal to blank the switching transient. Each antenna is enabled separately and for an equal time period. The sequence of sampling is antenna 4*a*, antenna 4*b*, antenna 4*c*, antenna 4*d*, antenna 4*e*, no antenna, i.e., reference load, and then the cycle repeats itself. Each port is enabled for about five hundred microseconds. The signal to switch 38 comes from the output of a NAND gate 46 as noted in FIG. 8. FIG. 8 also shows the p-i-n switch 6 drivers 48*a–e*. The circuitry in FIG. 8 is incorporated in the antenna selection controller 22. FIG. 7 shows the sequence of switching.

In the overall system, components are well shielded to avoid electromagnetic interference (EMI) from other components or disturbances outside the system. All input and output voltages are passed through radio frequency feedthroughs to help isolate the high gain amplifiers from electromagnetic interference. The signals between the various components of this system are fed through semirigid coaxial cables 50 with OSM (standard designator) connectors 52 available from various microwave vendors such as Omni Spectra in Merrimac, N.H. See FIG. 3.

Figure 9:
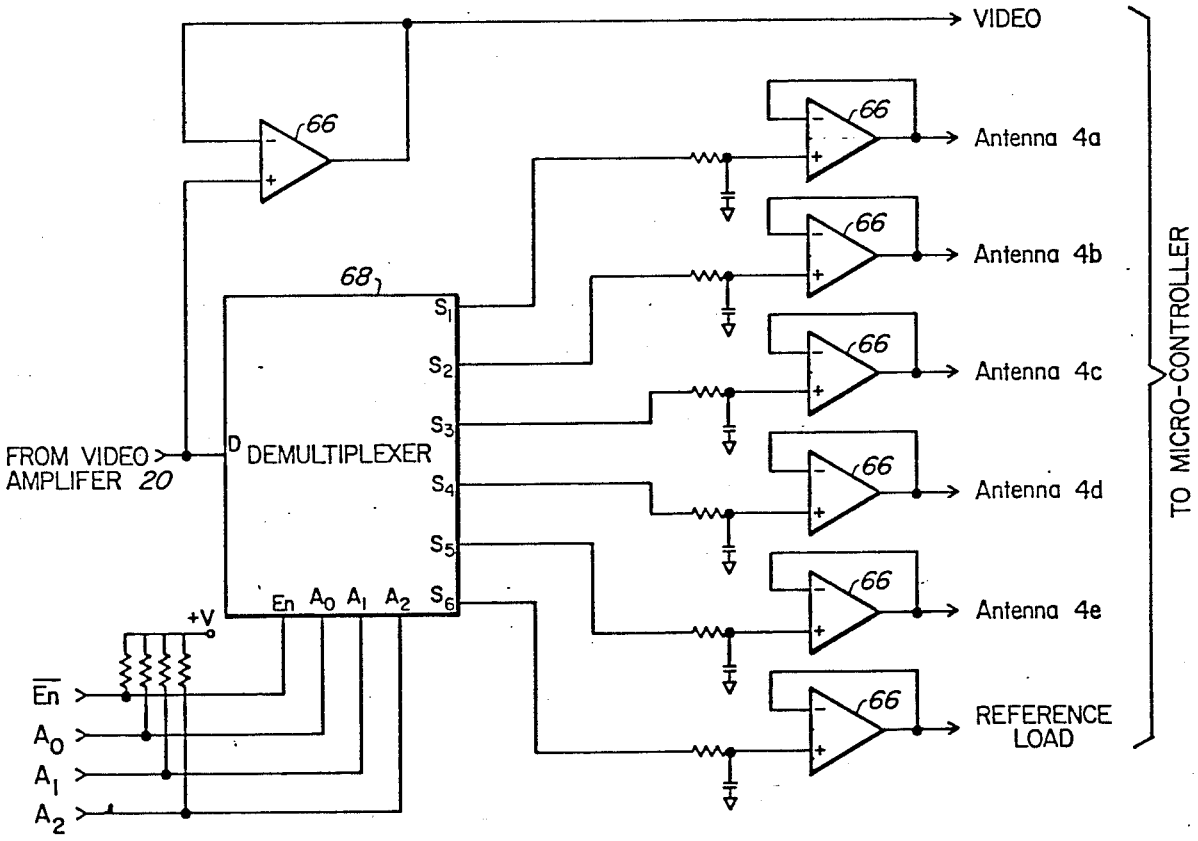
FIG. 9 is a schematic of the demultiplexer.
Figure 10:
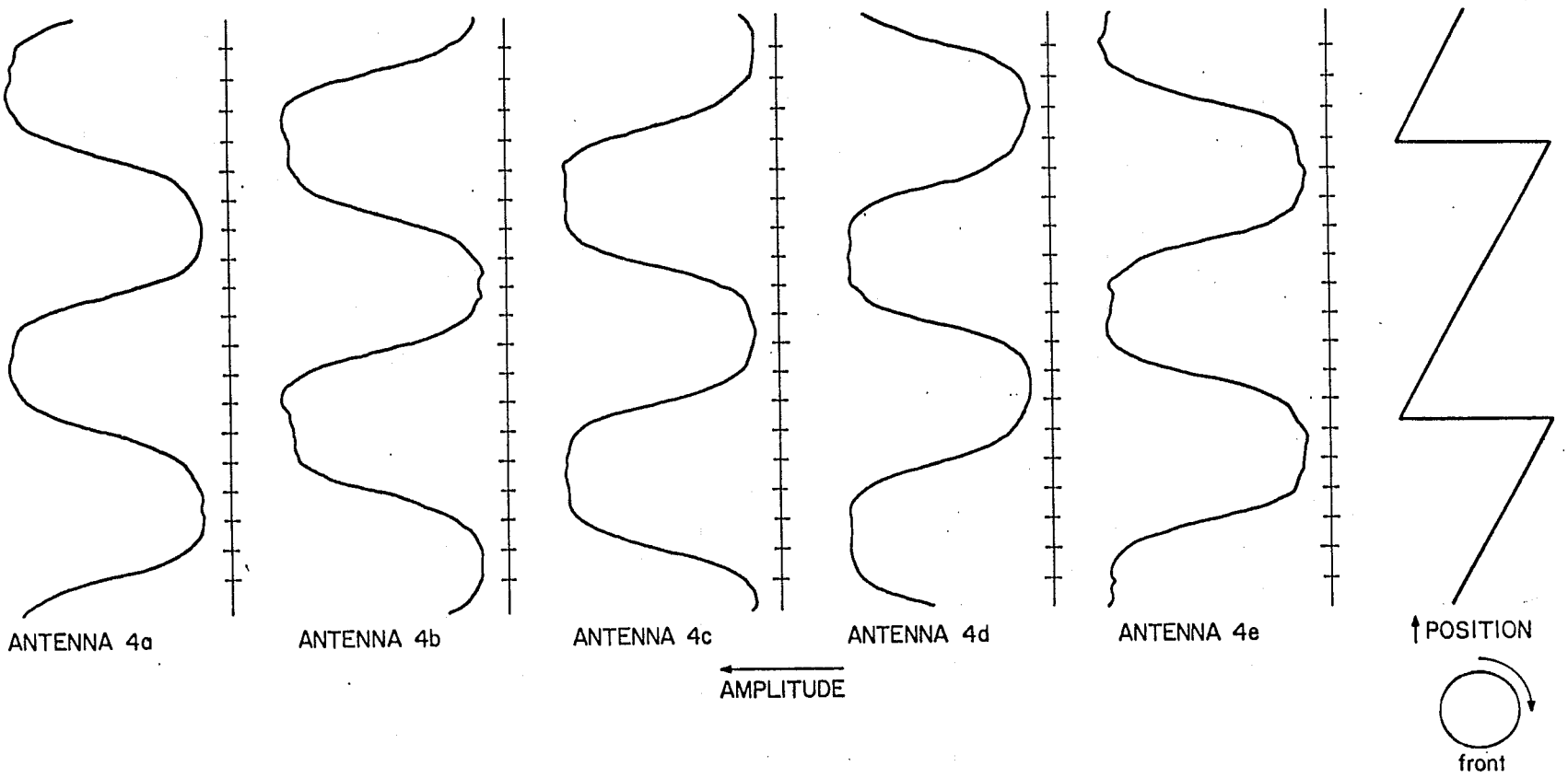
FIG. 10 is a timing diagram of position of the platform in relation to the amplitudes of the antenna signals.

The signal processor 24 accepts the output signal of output video amplifier 20 and the signals from the antenna selection controller 22. The signal processor 24 is composed of a demultiplexer 26 and a microcontroller 28. The demultiplexer 26 takes serial data from video amplifier 20 which ultimately comes from the alternate antenna assemblies 4*a–e* and it also takes the signals from the antenna selection controller 22 which consists of three lines of binary information indicating which antenna is bringing in the signal which is coming out of the video amplifier 20. From these sets of signals the demultiplexer 26 takes all signals that come from antenna 4*a* and outputs them on a single line and likewise from 4*b*, 4*c*, 4*d*, and 4*e* to separate lines respectively coming out of the demultiplexer 26 to the microcontroller 28. The schematic of the demultiplexer 26 is shown in FIG. 9. The signals from the demultiplexer 26 to the microcontroller 28 on the respective lines are shown in FIG. 10. FIG. 10 shows the outputs of antennas 4*a–e* and their angular displacements with respect to the other antenna signals-there being five antenna signals and a position signal used as a reference. The signals of the respective antennas 4*a–e* show the magnitude of the thermal radiation of the environment relative to the direction of the respective antenna.

The microcontroller 28 takes the respective antenna signals, normalizes them, and processes them via a look-up table in the read only memory (ROM) of the microcontroller 28. The data signals that come into the microcontroller 28 are normalized within the bounds of certain minimum and maximum values in view of a given reference value. Once the data are normalized, the signal amplitudes are sorted from coldest to hottest temperatures. These values are combined into a unique address which is used to access a look-up table in the microcontroller ROM. The values stored in the look-up table constitute the roll angle for a particular set of ordered signal amplitudes. The presently and previously computed roll angles with reference to the horizon are used to generate the roll angle rate. Out of the microcontroller 28 comes roll angle and roll angle rate data words which are output to such equipment as an autopilot.

The microcontroller 28 in this particular embodiment utilizes an Intel Corporation 16-bit microcontroller integrated circuit chip, Model No. 8097. The data sheet on this particular microcontroller is number 230997-001 dated Feb. 1984. The Intel Corporation is located in Santa Clara, Calif. The signal inputs are sent into the analog-to-digital converter of the 8097 microcontroller 28. The roll angle and roll angle rate data words are output of ports 3 and 4 of the 8097 microcontroller 28.

Figure 5:
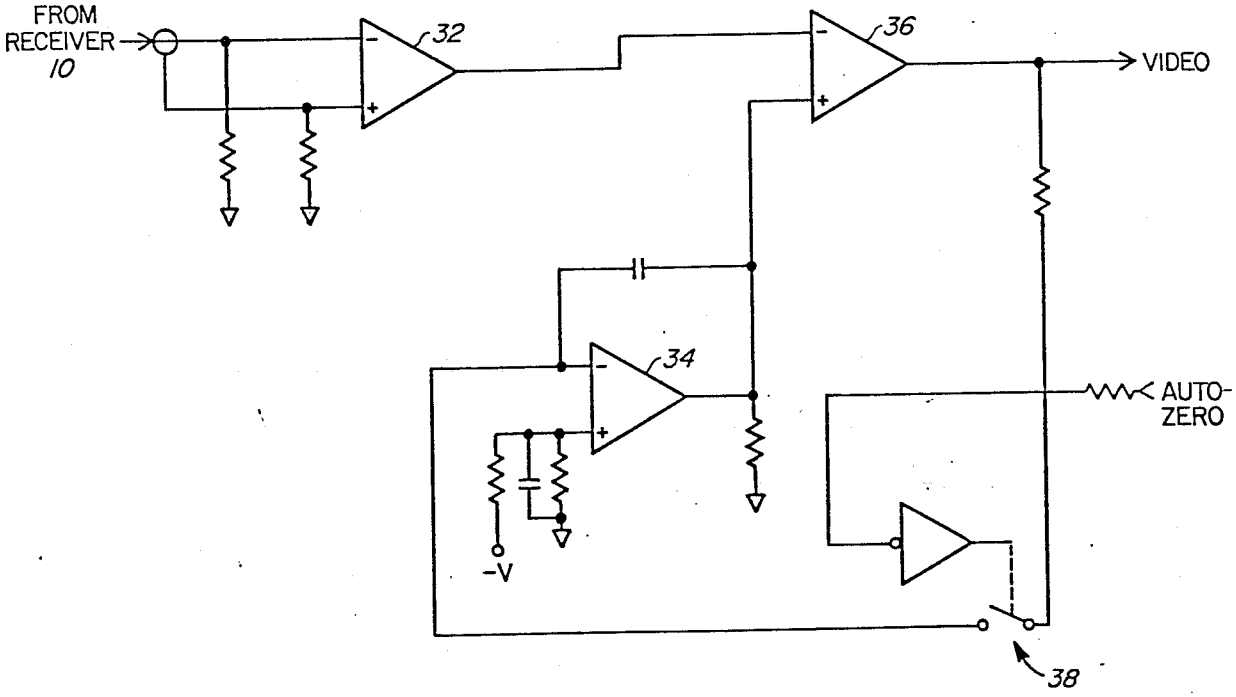
FIG. 5 is a schematic of the video amplifier incorporating the auto-zero circuit.

Various vendors have parts available for the above discussed horizon reference system. In FIG. 5, amplifiers 32 and 36 are instrumentation amplifier Model No. AD521 available from Analog Devices, Inc., in Norwood, Mass. Amplifier 34 is Model No. OP-11 available from Precision Monolithics, Inc., of Santa Clara, Calif.

Figure 6:
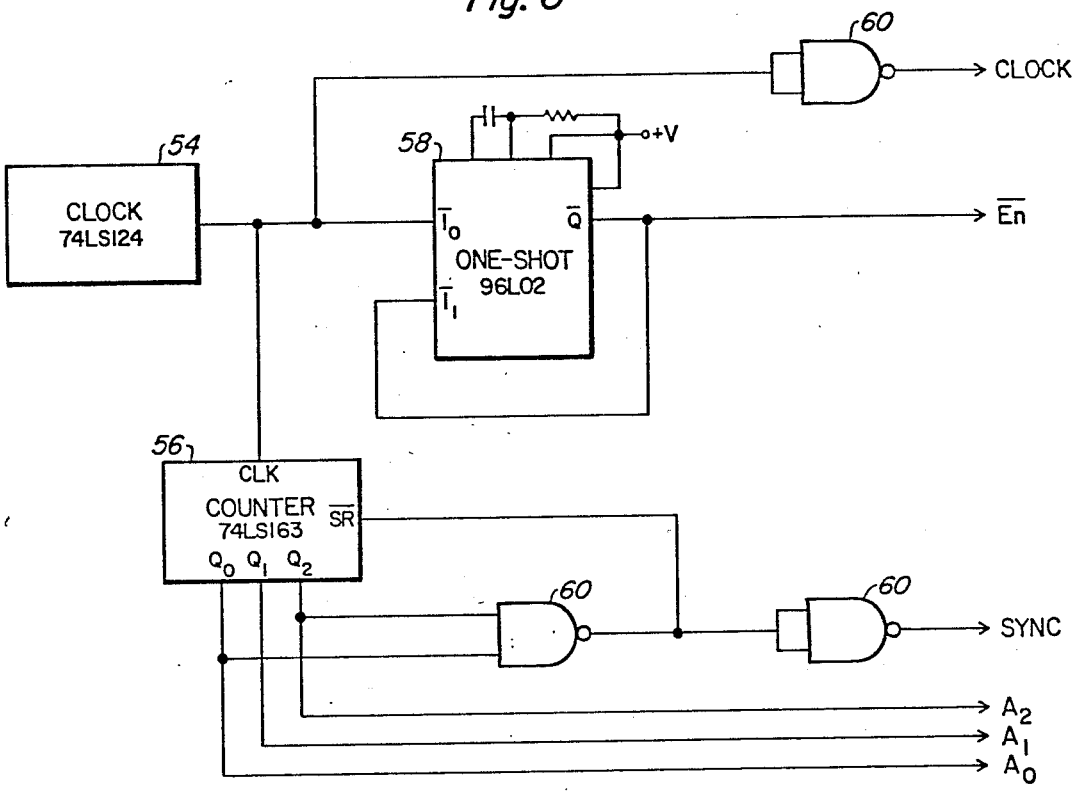
FIG. 6 is a schematic of the sequence generator.

In FIG. 6, clock 54 is a 74LS124 type integrated circuit (IC). Counter 56 is a 74LS163 type IC. One-shot circuit 58 is a 96L02 type IC. The NAND gates 60 are a 74LS00 type IC. These IC's are available from such organizations as Fairchild Corp. in Mountain View, Calif.

In FIG. 8, decoder 62 is a CD4028 device. NAND gates 46 and 48*a–e* are a CD40107B device. These devices are available from such places as RCA Solid State, Inc., Box 3200, Somerville, N.J. 08876.

In FIG. 9, amplifiers 66 are Model No. OP-11 circuits. Demultiplexer circuit 68 is a model no. MUX-08 circuit. These circuits are available from Precision Monolithics, Inc., of Santa Clara, Calif.

Obviously many modifications and variations, including utilizations of different parts, of the present invention are possible in light of the above teachings. It is therefore to be understood that within the scope of the appended claims the invention may be practiced otherwise than as specifically described.

What is claimed is:

1. A horizon reference system for a rotating body comprising:

a plurality of alternate antenna assemblies for receiving microwave energy from the environment;

a receiver;

an antenna selector switch connected between said plurality of alternate antenna assemblies and said receiver for selectively connecting said alternate antenna assemblies to said receiver, one at a time;

an antenna selection controller connected to said antenna selector switch for sequencing said antenna selector switch from one antenna assembly to another according to a predetermined sequence; and a signal processor connected to said antenna selection controller and said receiver for calculating attitudinal parameters for said rotating body.

2. A horizon reference system for a rotating body according to claim 1 wherein said receiver comprises:

a local oscillator;

a mixer connected to said local oscillator and effectively connected to said antenna selector switch;

an intermediate frequency amplifier connected to said mixer; and a half-wave detector connected to said intermediate frequency amplifier and effectively connected to said signal processor.

3. A horizon reference system for a rotating body comprising:

a plurality of alternate antenna assemblies for receiving microwave energy from the environment;

an isolator;

an antenna selector switch connected between said plurality of alternate antenna assemblies and said isolator, for selectively connecting said alternate antenna assemblies to said isolator, one at a time;

a receiver connected to said isolator;

an antenna selection controller connected to said antenna selector switch for sequencing said antenna selector switch from one antenna assembly to another according to a predetermined sequence;

a video amplifier connected to said receiver and to said antenna selection controller; and a signal processor connected to said antenna selection controller and to said video amplifier, for calculating attitudinal parameters for said rotating body.

4. A horizon reference system for a rotating body according to claim 3 wherein said video amplifier comprises an autozero circuit for removing any biases.

5. A horizon reference system for a rotating body according to claim 3 wherein said receiver comprises:

a local oscillator;

a mixer connected to said local oscillator and to said isolator;

an intermediate frequency amplifier connected to said mixer; and a detector connected to said intermediate frequency amplifier and to said video amplifier.

6. A horizon reference system for a rotating body according to claim 3 wherein said signal processor comprises:

a demultiplexer connected to said video amplifier and to said antenna selection controller; and a microcontroller connected to said demultiplexer and having a plurality of outputs.

7. A horizon reference system for a rotating body according to claim wherein said antenna selection controller comprises a sequence generator.

* * * * *